(12) United States Patent
Jordan et al.

(10) Patent No.: US 7,824,450 B2
(45) Date of Patent: Nov. 2, 2010

(54) DISPERSE DYES, THEIR PREPARATION AND THEIR USE

(75) Inventors: Hartwig Jordan, Bergisch-Gladbach (DE); Stefan Neubauer, Köln (DE)

(73) Assignee: DyStar Textilfarben GmbH & Co. Deutschland KG (DE)

( * ) Notice: Subject to any disclaimer, the term of this patent is extended or adjusted under 35 U.S.C. 154(b) by 15 days.

(21) Appl. No.: 12/447,033

(22) PCT Filed: Oct. 16, 2007

(86) PCT No.: PCT/EP2007/061002

§ 371 (c)(1),
(2), (4) Date: Apr. 24, 2009

(87) PCT Pub. No.: WO2008/049758

PCT Pub. Date: May 2, 2008

(65) Prior Publication Data

US 2010/0092670 A1      Apr. 15, 2010

(30) Foreign Application Priority Data

Oct. 27, 2006  (DE) .................. 10 2006 050 642

(51) Int. Cl.
*D06P 5/17* (2006.01)
*C09B 29/045* (2006.01)

(52) U.S. Cl. .............. 8/464; 8/662; 8/690; 8/691; 534/788

(58) Field of Classification Search .......... 8/464, 8/662, 690, 691; 534/788
See application file for complete search history.

(56) References Cited

FOREIGN PATENT DOCUMENTS

| DE | 2612742 A | 10/1976 |
|---|---|---|
| EP | 1411089 A1 | 4/2004 |
| GB | 909843 | 11/1962 |
| GB | 1536429 | 12/1978 |
| WO | WO-95/20014 A1 | 7/1995 |
| WO | WO-2005/056690 A1 | 6/2005 |
| WO | WO 2005/056690 A1 * | 6/2005 |

OTHER PUBLICATIONS

STIC Search Report dated Jun. 29, 2010.*

* cited by examiner

*Primary Examiner*—Eisa B Elhilo
(74) *Attorney, Agent, or Firm*—Connolly Bove Lodge & Hutz, LLP

(57) ABSTRACT

The present invention provides dyes of the general formula (I)

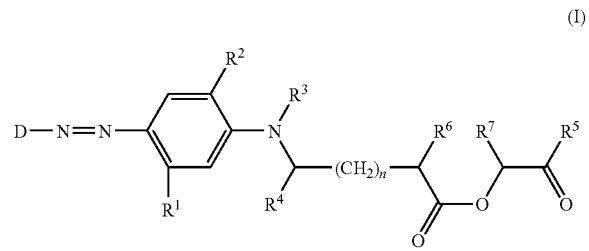

(I)

where D, $R^1$ to $R^7$ and n are each as defined in claim 1, processes for their preparation and their use.

12 Claims, No Drawings

DISPERSE DYES, THEIR PREPARATION AND THEIR USE

CROSS-REFERENCE TO RELATED APPLICATIONS

This application is a national stage application (under 35 U.S.C. §371) of PCT/EP2007/061002, filed Oct. 16, 2007, which claims benefit of German application 10 2006 050642.1, filed Oct. 27, 2006.

BACKGROUND OF THE INVENTION

The present invention relates to disperse azo dyes in which a 2-oxoalkyl ester is linked to the chromophore. Dyes having this structural element are already known and described for example in GB 909843, WO95/20014 and WO05/056690. It has now been found that disperse azo dyes in which the structural element in question is linked to further selected structural elements in a certain manner have excellent properties and provide dyeings having excellent wash fastnesses and very good sublimation fastnesses.

BRIEF SUMMARY OF THE INVENTION

The invention relates to a dye of the formula (I)

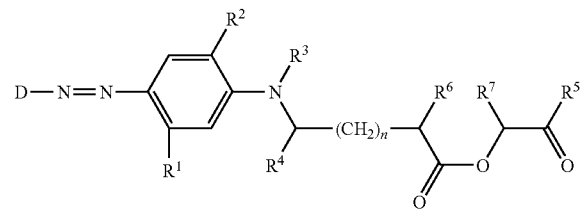

where
D is the radical of a diazo component;
$R^1$ is hydrogen, $(C_1-C_6)$-alkyl, $(C_1-C_4)$-alkoxy, hydroxyl, halogen, —NHCHO, —NHCO$(C_1-C_6)$-alkyl, —NHCOaryl, —NHSO$_2(C_1-C_6)$-alkyl or —NHSO$_2$aryl;
$R^2$ is hydrogen, $(C_1-C_6)$-alkyl, $(C_1-C_4)$-alkoxy, phenoxy or halogen;
$R^3$ is hydrogen, $(C_1-C_6)$-alkyl, substituted $(C_1-C_6)$-alkyl, $(C_3-C_4)$-alkenyl or substituted $(C_3-C_4)$-alkenyl;
or $R^2$ and $R^3$ combine to form the radical —C*H(CH$_3$)CH$_2$C (CH$_3$)$_2$—, where the carbon atom marked by * is attached to the phenyl nucleus;
$R^4$ is hydrogen, $(C_1-C_6)$-alkyl or phenyl;
$R^5$ is $(C_1-C_6)$-alkyl or substituted $(C_1-C_6)$-alkyl;
$R^6$ is hydrogen or $(C_1-C_6)$-alkyl;
$R^7$ is hydrogen, $(C_1-C_6)$-alkyl or phenyl; and
n 0, 1, 2 or 3;

although the compounds of the formulae

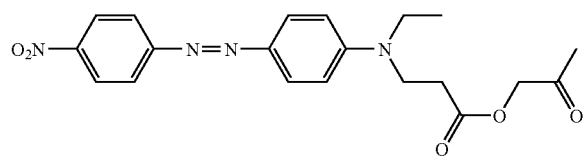

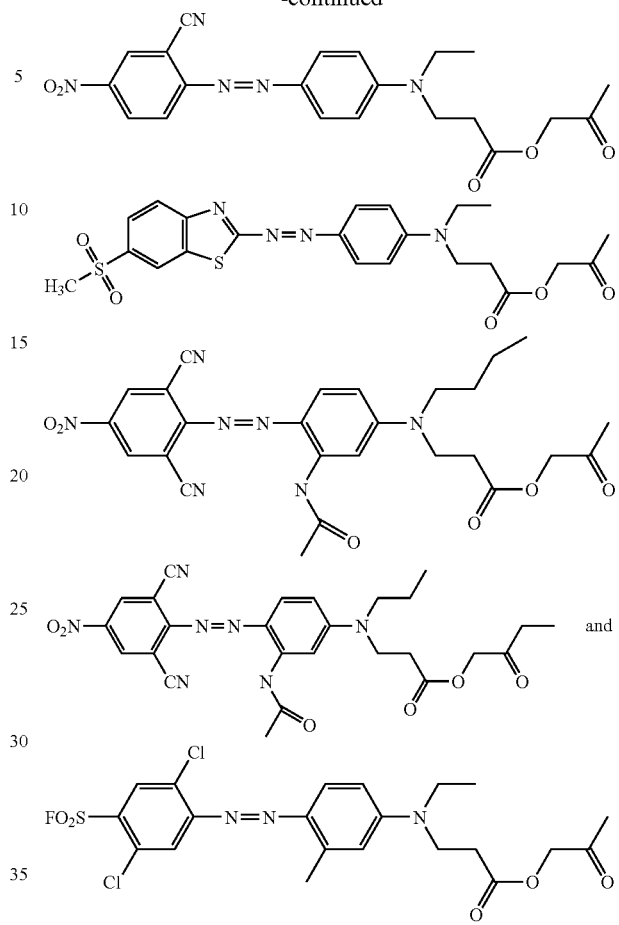

shall be excluded. The invention also relates to the process to make the dye and the process of using the dye.

DETAILED DESCRIPTION OF THE INVENTION

D radicals of a diazo component are in particular those customary in the field of disperse dyes and known to one skilled in the art.

Preferably, D represents a group of the formula (IIa)

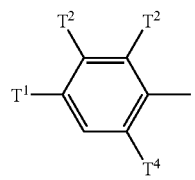

where
$T^1$ and $T^2$ independently are hydrogen, $(C_1-C_6)$-alkyl, $(C_1-C_4)$-alkoxy, —SO$_2(C_1-C_6)$-alkyl, —SO$_2$aryl, cyano, halogen or nitro; and
$T^4$ and $T^3$ independently are hydrogen, halogen, trifluoromethyl, cyano, —SCN, —SO$_2$CH$_3$ or nitro;

although at least one of $T^1$, $T^2$, $T^3$ and $T^4$ is not hydrogen;

or represents a group of the formula (IIb)

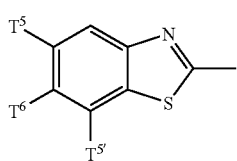
(IIb)

where
$T^5$ and $T^{5'}$ independently are hydrogen or halogen; and
$T^6$ is hydrogen, —$SO_2CH_3$, —SCN, $(C_1-C_4)$-alkoxy, halogen or nitro;

although at least one of $T^5$, $T^{5'}$ and $T^6$ is not hydrogen;

or represents a group of the formula (IIc)

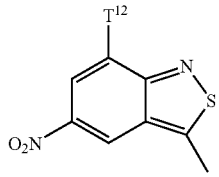
(IIc)

where
$T^{12}$ is hydrogen or halogen;

or represents a group of the formula (IId)

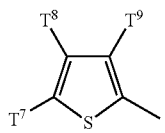
(IId)

where
$T^7$ is nitro, —CHO, cyano, —$COCH_3$ or a group of the formula

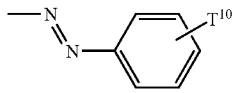

where $T^{10}$ is hydrogen, halogen, nitro or cyano;
$T^8$ is hydrogen, $(C_1-C_6)$-alkyl or halogen; and
$T^9$ is nitro, cyano, —$COCH_3$ or —$COOT^{11}$; where $T^{11}$ is $(C_1-C_4)$-alkyl;

or represents a group of the formula (IIe)

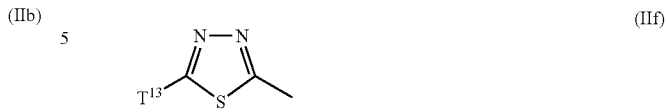
(IIe)

where $T^7$ and $T^8$ are each as defined above;

or represents a group of the formula (IIf)

(IIf)

where $T^{13}$ is phenyl or S—$(C_1-C_4)$-alkyl.

$(C_1-C_6)$-Alkyl groups may be straight chain or branched and are, for example, methyl, ethyl, n-propyl, i-propyl, n-butyl, i-butyl, tert-butyl, n-pentyl or n-hexyl. A similar logic applies to alkoxy groups, which are methoxy or ethoxy for example. $(C_3-C_4)$-Alkenyl groups are in particular allyl.

Substituted $(C_1-C_6)$-alkyl and $(C_3-C_4)$-alkenyl groups are in particular substituted by 1 to 3 substituents from the group consisting of halogen, cyano, hydroxyl, $(C_1-C_6)$-alkoxy, —COO$(C_1-C_6)$-alkyl, —COOaryl, —OCOO$(C_1-C_6)$-alkyl, —OCOOaryl, —OCO$(C_1-C_6)$-alkyl, phenyl, —OCOphenyl and phenoxy.

Aryl is in particular phenyl or naphthyl, —$NHSO_2$aryl is in particular phenylsulfonylamino. Halogen preferably represents chlorine or bromine.

$R^1$ is preferably hydrogen, chlorine, methyl, ethyl, hydroxyl, methoxy, ethoxy, acetylamino, propionylamino, benzoylamino, methylsulfonylamino, ethylsulfonylamino or phenylsulfonylamino.

$R^2$ is preferably hydrogen, chlorine, methyl, ethyl, methoxy, ethoxy or phenoxy.

$R^3$ is preferably hydrogen, methyl, ethyl, propyl, butyl, benzyl, phenylethyl, phenoxyethyl, methoxyethyl, cyanoethyl, —$C_2H_4OCOCH_3$, —$C_2H_4OCOC_2H_5$, —$C_2H_4COOCH_3$, —$C_2H_4COOC_2H_5$ or allyl.

$R^4$ and $R^7$ are each preferably hydrogen, methyl or phenyl, more preferably hydrogen. $R^6$ is preferably hydrogen or methyl.

$R^5$ is preferably methyl or ethyl.

n is preferably 0 or 1, more preferably 0.

Preferred dyes according to the present invention conform to the general formula (Ia)

(Ia)

where $T^1$ to $T^4$, $R^1$ to $R^7$ and n are each as defined above, but the compounds of the formulae

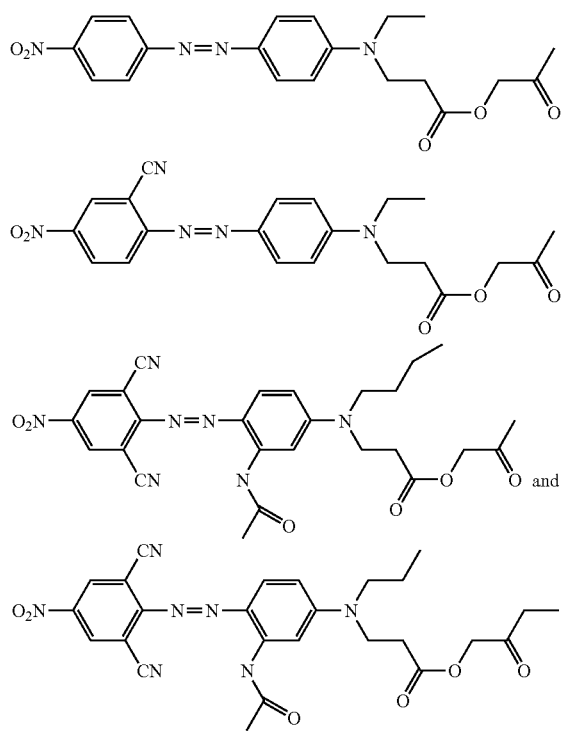

shall be excluded.

In preferred dyes of the general formula (Ia), $R^3$ is not ethyl when $R^1$ is hydrogen and n=0. In further preferred dyes of the general formula (Ia), $R^3$ is not n-propyl or n-butyl when $R^1$ is —NHCOCH$_3$ and n=0.

In particularly preferred dyes of the general formula (Ia), 
$R^1$ is acetylamino, propionylamino, benzoylamino or methylsulfonylamino;
$R^2$ is hydrogen, chlorine, methoxy or ethoxy;
$R^3$ is hydrogen, methyl, ethyl, allyl or benzyl;
$R^4$ is hydrogen or methyl;
$R^5$ methyl or ethyl;
$R^6$ is hydrogen or methyl and
$R^7$ is hydrogen, methyl or phenyl.

Particularly preferred dyes of the general formula (Ia) according to the present invention conform to the general formula (Iaa)

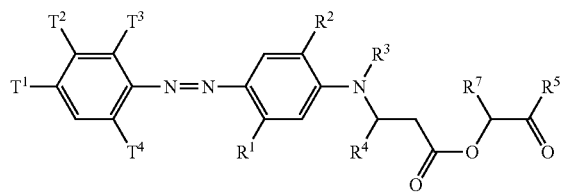

where
$T^1$ is hydrogen, nitro or methyl;
$T^2$ is hydrogen, nitro or chlorine;
$T^3$ is hydrogen, cyano, chlorine or bromine;
$T^4$ is hydrogen, cyano, nitro, chlorine, bromine or trifluoromethyl;

$R^1$ is hydrogen, hydroxyl, chlorine, methyl, acetylamino, propionylamino, benzoylamino or methylsulfonylamino;
$R^2$ is hydrogen, chlorine, methyl, phenoxy, methoxy or ethoxy;
$R^3$ is hydrogen, methyl, ethyl, butyl, benzyl, phenylethyl, phenoxyethyl or allyl;
$R^5$ is methyl or ethyl; and
$R^4$ and $R^7$ are hydrogen, methyl or phenyl;

although the compounds of the formulae

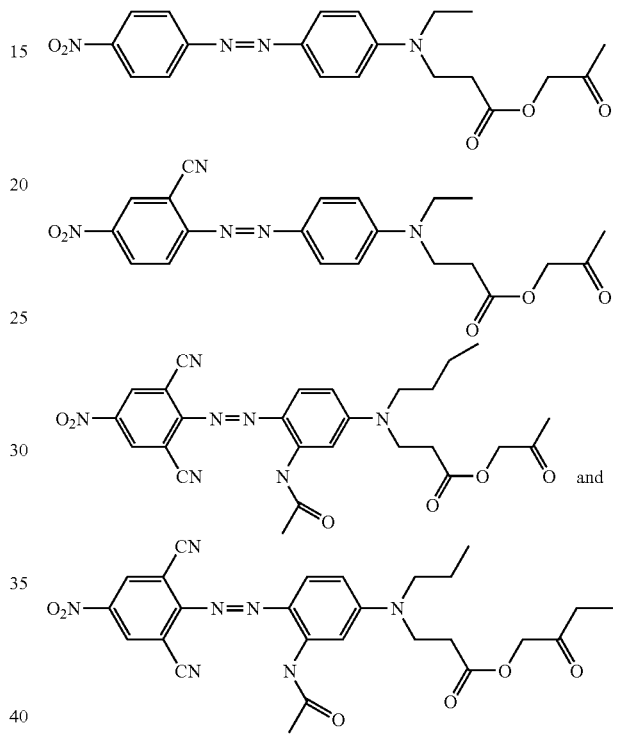

shall be excluded.

In preferred dyes of the general formula (Iaa), $R^3$ is not ethyl when $R^1$ is hydrogen. In further preferred dyes of the general formula (Ia), $R^3$ is not n-propyl or n-butyl when $R^1$ is —NHCOCH$_3$.

Further preferred dyes according to the present invention conform to the general formula (Ib)

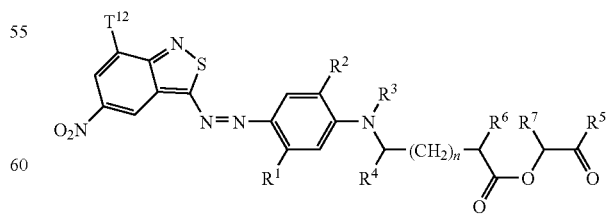

where $T^{12}$, $R^1$ to $R^7$ and n are each as defined above.

Particularly preferred dyes of this type according to the present invention conform to the general formula (Iba)

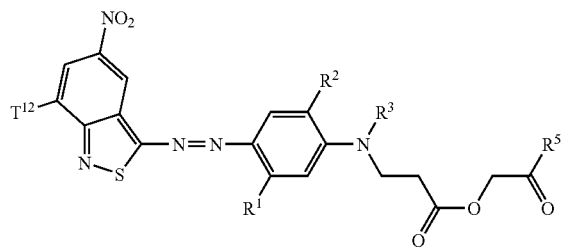

(Iba)

where
T$^{12}$ is hydrogen, chlorine or bromine;
R$^1$ is hydrogen, hydroxyl, methyl, acetylamino or propionylamino;
R$^2$ is hydrogen, methyl, chlorine or methoxy;
R$^3$ is hydrogen, ethyl, butyl, benzyl or allyl; and
R$^5$ is methyl or ethyl.

Further preferred dyes according to the present invention conform to the general formula (Ic)

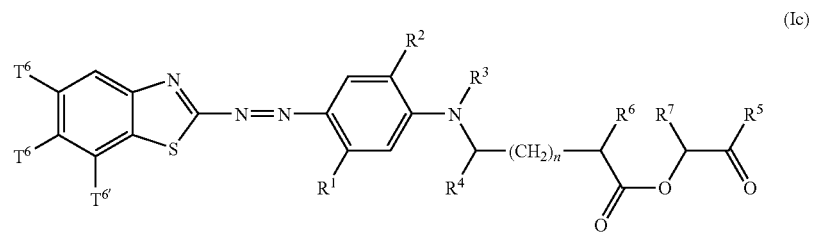

(Ic)

where T$^5$, T$^{5'}$, T$^6$, R$^1$ to R$^7$ and n are each as defined above.

Particularly preferred dyes of this type according to the present invention conform to the general formula (Ica)

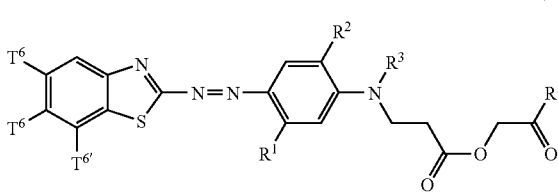

(Ica)

where
T$^5$ and T$^{5'}$ independently are hydrogen or halogen;
T$^6$ is halogen or nitro;
R$^1$ is hydrogen, hydroxyl, methyl, acetylamino or propionylamino;
R$^2$ is hydrogen, methyl, chlorine or methoxy;
R$^3$ is hydrogen, ethyl, butyl, benzyl or allyl; and
R$^5$ is methyl or ethyl.

Further preferred dyes according to the present invention conform to the general formula (Id)

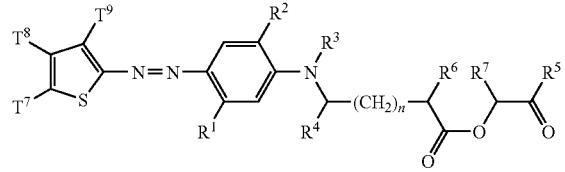

(Id)

where T$^7$ to T$^9$, R$^1$ to R$^7$ and n are each as defined above.

Particularly preferred dyes of this type according to the present invention conform to the general formula (Ida)

(Ida)

where
T$^7$ is nitro, —CHO or cyano;
T$^8$ is hydrogen, methyl or chlorine;
T$^9$ is nitro, cyano or —COCH$_3$;
R$^1$ is hydrogen, hydroxyl, methyl, acetylamino or propionylamino;
R$^2$ is hydrogen, methyl, chlorine or methoxy;
R$^3$ is hydrogen, methyl, ethyl, butyl, benzyl, phenoxyethyl or allyl; and
R$^5$ is methyl or ethyl.

Further particularly preferred dyes of this type according to the present invention conform to the general formula (Idb)

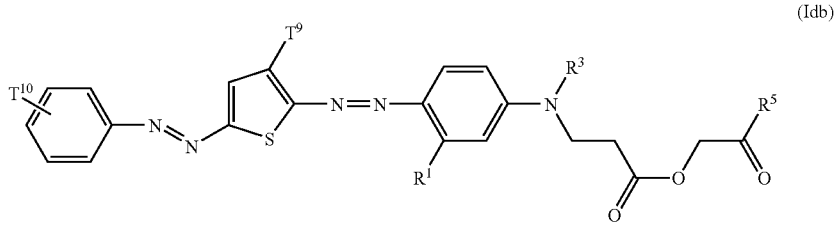
(Idb)

where
$T^{10}$ is nitro;
$T^9$ is cyano or —$COCH_3$;
$R^1$ is hydrogen, methyl or acetylamino;
$R^3$ is methyl, ethyl, butyl or allyl; and
$R^5$ methyl or ethyl.

Further preferred dyes according to the present invention conform to the general formula (Ie)

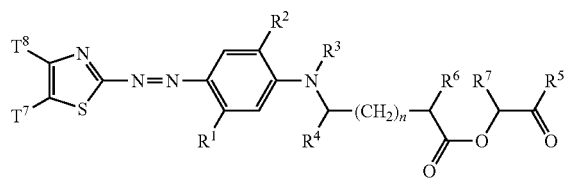
(Ie)

where $T^7$, $T^8$, $R^1$ to $R^7$ and n are each as defined above and $T^7$ is in particular nitro, —CHO, $COCH_3$ or cyano.

Particularly preferred dyes of this type according to the present invention conform to the general formula (Iea)

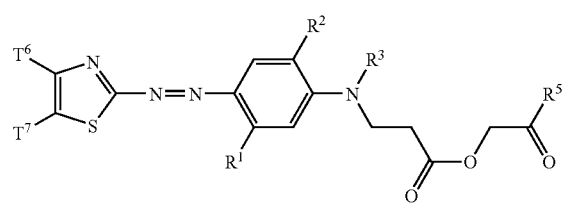
(Iea)

where
$T^7$ is nitro, —CHO or cyano;
$T^8$ is hydrogen or chlorine;
$R^1$ is hydrogen, hydroxyl, methyl, acetylamino or propionylamino;
$R^2$ is hydrogen, methyl, chlorine or methoxy;
$R^3$ is hydrogen, methyl, ethyl, butyl, benzyl, phenoxyethyl or allyl; and
$R^5$ is methyl or ethyl.

Further preferred dyes according to the present invention conform to the general formula (If)

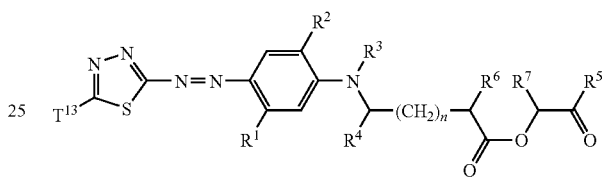
(If)

where
$T^{13}$, $R^1$ to $R^7$ and n are each as defined above.

Particularly preferred dyes of this type according to the present invention conform to the general formula (Ifa)

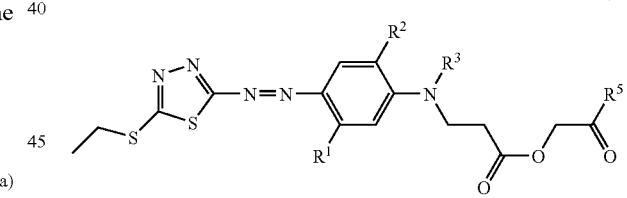
(Ifa)

where
$R^1$ is hydrogen, hydroxyl, methyl, acetylamino or propionylamino;
$R^2$ is hydrogen, methyl, chlorine or methoxy;
$R^3$ is hydrogen, methyl, ethyl, butyl, benzyl, phenoxyethyl or allyl; and
$R^5$ is methyl or ethyl.

The dyes of the general formula (I) according to the present invention are obtainable using methods known to one skilled in the art.

For instance, a compound of the general formula (III)

$$D\text{-}NH_2 \quad (III)$$

where D is as defined above, is diazotized and coupled onto a compound of the general formula (IV)

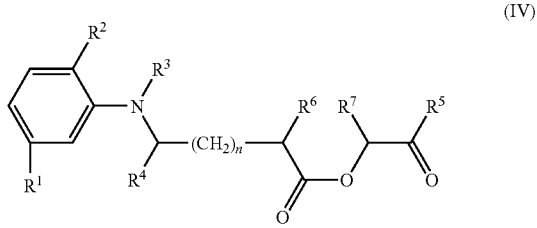

(IV)

where $R^1$ to $R^7$ and n are each as defined above.

The diazotizing of the compounds of the general formula (III) is generally effected in a known manner, for example using sodium nitrite in an aqueous medium rendered acidic, for example with hydrochloric or sulfuric acid, or using nitrosylsulfuric acid in dilute sulfuric acid, phosphoric acid or in a mixture of acetic acid and propionic acid. The preferred temperature range is between 0° C. and 15° C.

The coupling of the diazotized compounds onto the compounds of the general formula (IV) is generally likewise effected in a known manner, for example in an acidic, aqueous, aqueous-organic or organic medium, particularly advantageously at temperatures below 10° C. Acids used are in particular sulfuric acid, acetic acid or propionic acid.

The compounds of the general formulae (III) and (IV) are known and can be prepared by known methods.

The present invention's dyes of the general formula (I) are very useful for dyeing and printing hydrophobic materials, the dyeings and prints obtained being notable for level hues and high service fastnesses. Deserving of particular mention are excellent wash fastnesses and very good sublimation fastnesses.

The present invention thus also provides for the use of the dyes of the general formula I for dyeing and printing hydrophobic materials, i.e., processes for dyeing or printing such materials in a conventional manner wherein one or more dyes of the general formula (I) according to the present invention are used as a colorant.

The hydrophobic materials mentioned may be of synthetic or semisynthetic origin. Useful hydrophobic materials include for example secondary cellulose acetate, cellulose triacetate, polyamides and, in particular, high molecular weight polyesters. Materials of high molecular weight polyester are in particular those based on polyethylene glycol terephthalates.

The hydrophobic synthetic materials can be present in the form of sheet- or threadlike constructions and can have been processed, for example, into yarns or into woven or knit textile materials. Preference is given to fibrous textile materials, which may also be present in the form of microfibers for example.

The dyeing in accordance with the use provided by the present invention can be carried out in a conventional manner, preferably from an aqueous dispersion, if appropriate in the presence of carriers, at between 80 to about 110° C. by the exhaust process or by the HT process in a dyeing autoclave at 110 to 140° C., and also by the so-called thermofix process, in which the fabric is padded with the dyeing liquor and subsequently fixed/set at about 180 to 230° C.

Printing of the materials mentioned can be carried out in a manner known per se by incorporating the dye of the general formula (I) of the present invention in a print paste and treating the fabric printed therewith at temperatures between 180 to 230° C. with HT steam, high-pressure steam or dry heat, if appropriate in the presence of a carrier, to fix the dye.

The dyes of the general formula (I) of the present invention shall be in a very fine state of subdivision when they are used in dyeing liquors, padding liquors or print pastes.

The dyes are converted into the fine state of subdivision in a conventional manner by slurrying the as-fabricated dye together with dispersants in a liquid medium, preferably in water, and subjecting the mixture to the action of shearing forces to mechanically comminute the original dye particles to such an extent that an optimal specific surface area is achieved and sedimentation of the dye is minimized. This is accomplished in suitable mills, such as ball or sand mills. The particle size of the dyes is generally between 0.5 and 5 μm and preferably equal to about 1 μm.

The dispersants used in the milling operation can be nonionic or anionic. Nonionic dispersants include for example reaction products of alkylene oxides, for example ethylene oxide or propylene oxide, with alkylatable compounds, for example fatty alcohols, fatty amines, fatty acids, phenols, alkylphenols and carboxamides. Anionic dispersants are for example lignosulfonates, alkyl- or alkylarylsulfonates or alkylaryl polyglycol ether sulfates.

The dye preparations thus obtained should be pourable for most applications. Accordingly, the dye and dispersant content is limited in these cases. In general, the dispersions are adjusted to a dye content up to 50 percent by weight and a dispersant content up to about 25 percent by weight. For economic reasons, dye contents are in most cases not allowed to be below 15 percent by weight. The dispersions may also contain still further auxiliaries, for example those which act as an oxidizing agent, for example sodium m-nitrobenzenesulfonate, or fungicidal agents, for example sodium o-phenylphenoxide and sodium pentachlorophenoxide, and particularly so-called "acid donors", examples being butyrolactone, monochloroacetamide, sodium chloroacetate, sodium dichloroacetate, the sodium salt of 3-chloropropionic acid, monosulfate esters such as lauryl sulfate for example, and also sulfuric esters of ethoxylated and propoxylated alcohols, for example butylglycol sulfate.

The dye dispersions thus obtained are very advantageous for making up dyeing liquors and print pastes.

There are certain fields of use where powder formulations are preferred. These powders comprise the dye, dispersants and other auxiliaries, for example wetting, oxidizing, preserving and dustproofing agents and the abovementioned "acid donors".

A preferred method of making pulverulent preparations of dye consists in stripping the above-described liquid dye dispersions of their liquid, for example by vacuum drying, freeze drying, by drying on drum dryers, but preferably by spray drying.

The dyeing liquors are made by diluting the requisite amounts of the above-described dye formulations with the dyeing medium, preferably water, such that a liquor ratio of 5:1 to 50:1 is obtained for dyeing. In addition, it is generally customary to include further dyeing auxiliaries, such as dispersing, wetting and fixing auxiliaries, in the liquors. Organic and inorganic acids such as acetic acid, succinic acid, boric acid or phosphoric acid are included to set a pH in the range from 4 to 5, preferably 4.5. It is advantageous to buffer the pH setting and to add a sufficient amount of a buffering system. The acetic acid/sodium acetate system is an example of an advantageous buffering system.

To use the dye or dye mixture in textile printing, the requisite amounts of the abovementioned dye formulations are kneaded in a conventional manner together with thickeners, for example alkali metal alginates or the like, and if appropriate further additives, for example fixation accelerants, wetting agents and oxidizing agents, to give print pastes.

The present invention also provides inks for digital textile printing by the ink jet process, comprising a present invention dye of the general formula (I).

The inks of the present invention are preferably aqueous and comprise one or more of the present invention's dyes of the general formula (I), for example in amounts of 0.1% to 50% by weight, preferably in amounts of 1% to 30% by weight and more preferably in amounts of 1% to 15% by weight based on the total weight of the ink. They further comprise in particular from 0.1% to 20% by weight of a dispersant. Suitable dispersants are known to one skilled in the art, are commercially available and include for example sulfonated or sulfomethylated lignins, condensation products of aromatic sulfonic acids and formaldehyde, condensation products of substituted or unsubstituted phenol and formaldehyde, polyacrylates and corresponding copolymers, modified polyurethanes and reaction products of alkylene oxides with alkylatable compounds, for example fatty alcohols, fatty amines, fatty acids, carboxamides and substituted or unsubstituted phenols.

The inks of the present invention may further comprise customary additives, for example viscosity moderators to set viscosities in the range from 1.5 to 40.0 mPas in the temperature range of 20 to 50° C. Preferred inks have a viscosity in the range from 1.5 to 20 mPas and particularly preferred inks have a viscosity in the range from 1.5 to 15 mPas.

Useful viscosity moderators include rheological additives, for example polyvinyl-caprolactam, polyvinylpyrrolidone and also their copolymers, polyetherpolyol, associative thickeners, polyureas, sodium alginates, modified galactomannans, polyetherurea, polyurethane and nonionic cellulose ethers.

By way of further additives, the inks of the present invention may include surface-active substances to set surface tensions in the range from 20 to 65 mN/m, which are if appropriate adapted depending on the process used (thermal or piezo technology). Useful surface-active substances include for example surfactants of any kind, preferably nonionic surfactants, butyldiglycol and 1,2 hexanediol.

The inks may further include customary additives, for example chemical species to inhibit fungal and bacterial growth in amounts from 0.01% to 1% by weight based on the total weight of the ink.

The inks of the present invention can be prepared in conventional manner by mixing the components in water.

EXAMPLE 1

4.6 g of 6-chloro-2,4-dinitroaniline are introduced into a mixture of 9.8 ml of sulfuric acid (96%), 0.5 ml of water and 3.5 ml of nitrosylsulfuric acid (40%) at 30 to 35° C. After 3 hours of stirring at 30-35° C., excess nitrite is destroyed with amidosulfonic acid. The diazonium salt solution thus obtained is expediently added dropwise to a mixture of 7.0 g of 2-oxopropyl 3-[(5-acetylamino-2-methoxyphenyl)ethylamino]-propionate, 50 ml of methanol and 200 g of ice. After stirring for one hour the solids are filtered off with suction, washed with water and dried to leave 7.3 g of the dye of the formula (Iab)

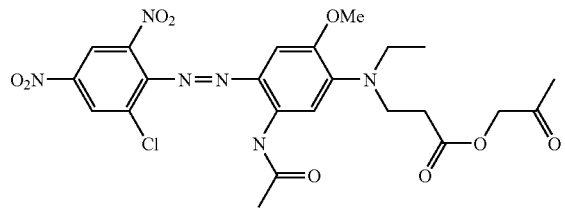

($\lambda_{max}$ [DMF]=606 nm), which dyes polyester in blue hues having good wash and sublimation fastnesses.

EXAMPLE 2

7.5 g of 2-oxopropyl 3-{[3-acetylamino-4-(2,6-dibromo-4-nitrophenylazo)phenyl]-ethylamino}propionate and 2.15 g of copper(I) cyanide are stirred in 30 ml of N-methylpyrrolidone at 80° C. for 4 hours. After cooling, 200 ml of methanol and 30 ml of water are added dropwise. The precipitate is filtered off with suction, washed with 5% hydrochloric acid and water and dried under reduced pressure to leave 4.9 g of the dye of the formula (Iac)

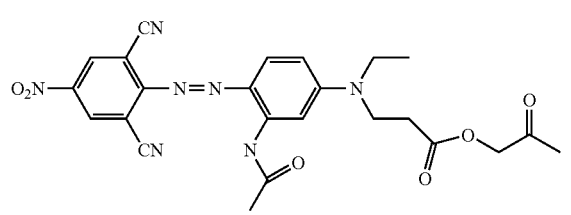

($\lambda_{max}$ [DMF]=612 nm), which dyes polyester in brilliant, blue shades and has excellent wash and sublimation fastnesses.

EXAMPLE 3

Example 2 is repeated except it proceeds from 2-oxopropyl 3-{[3-acetylamino-4-(6-bromo-2,4-dinitrophenylazo)phenyl]ethylamino}propionate and utilizes only one equivalent of copper(I) cyanide. The dye thus obtained has the formula (Iad)

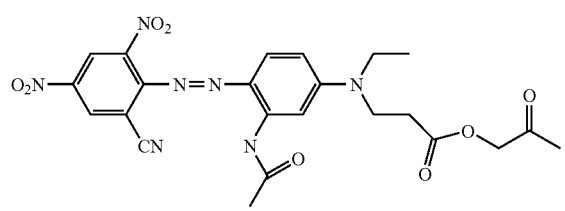

($\lambda_{max}$ [DMF]=602 nm) and dyes polyester in brilliant, blue shades and gives excellent wash and sublimation fastnesses.

Examples 4 to 145 of Table 1 were prepared in a similar manner.

TABLE 1

| Example | $T^1$ | $T^2$ | $T^3$ | $T^4$ | $R^1$ | $R^2$ | $R^3$ | $R^5$ | $R^4$ | $R^6$ | $R^7$ | n | $\lambda_{max}$ (nm) DMF |
|---|---|---|---|---|---|---|---|---|---|---|---|---|---|
| 4 | NO$_2$ | H | Br | NO$_2$ | NHCOCH$_3$ | OCH$_3$ | CH$_2$CH$_3$ | CH$_3$ | H | H | H | 0 | 604 |
| 5 | NO$_2$ | H | H | NO$_2$ | NHCOCH$_3$ | OCH$_3$ | CH$_2$CH$_3$ | CH$_3$ | H | H | H | 0 | 582 |
| 6 | NO$_2$ | H | Br | CN | NHCOCH$_3$ | OCH$_3$ | CH$_2$CH$_3$ | CH$_3$ | H | H | H | 0 | 632 |
| 7 | NO$_2$ | H | Cl | NO$_2$ | NHCOCH$_3$ | OCH$_3$ | CH$_2$CH$_3$ | C$_2$H$_5$ | H | H | H | 0 | 604 |
| 8 | NO$_2$ | H | Br | NO$_2$ | NHCOCH$_3$ | OCH$_3$ | CH$_2$CH$_3$ | C$_2$H$_5$ | H | H | H | 0 | 604 |
| 9 | NO$_2$ | H | H | NO$_2$ | NHCOCH$_3$ | OCH$_3$ | CH$_2$CH$_3$ | C$_2$H$_5$ | H | H | H | 0 | 582 |
| 10 | NO$_2$ | H | Cl | NO$_2$ | NHCOCH$_3$ | OCH$_3$ | CH$_3$ | CH$_3$ | H | H | H | 0 | 600 |
| 11 | NO$_2$ | H | Br | NO$_2$ | NHCOCH$_3$ | OCH$_3$ | CH$_3$ | CH$_3$ | H | H | H | 0 | 598 |
| 12 | NO$_2$ | H | H | NO$_2$ | NHCOCH$_3$ | OCH$_3$ | CH$_3$ | CH$_3$ | H | H | H | 0 | 572 |
| 13 | NO$_2$ | H | Cl | NO$_2$ | NHCOCH$_3$ | OCH$_3$ | CH$_2$CH=CH$_2$ | CH$_3$ | H | H | H | 0 | 598 |
| 14 | NO$_2$ | H | Br | NO$_2$ | NHCOCH$_3$ | OCH$_3$ | CH$_2$CH=CH$_2$ | CH$_3$ | H | H | H | 0 | 598 |
| 15 | NO$_2$ | H | H | NO$_2$ | NHCOCH$_3$ | OCH$_3$ | CH$_2$CH=CH$_2$ | CH$_3$ | H | H | H | 0 | 574 |
| 16 | NO$_2$ | H | Cl | NO$_2$ | NHCOCH$_3$ | OCH$_3$ | CH$_2$C$_6$H$_5$ | CH$_3$ | H | H | H | 0 | 590 |
| 17 | NO$_2$ | H | Br | NO$_2$ | NHCOCH$_3$ | OCH$_3$ | CH$_2$C$_6$H$_5$ | CH$_3$ | H | H | H | 0 | 590 |
| 18 | NO$_2$ | H | H | NO$_2$ | NHCOCH$_3$ | OCH$_3$ | CH$_2$C$_6$H$_5$ | CH$_3$ | H | H | H | 0 | 570 |
| 19 | NO$_2$ | H | CN | NO$_2$ | NHCOCH$_3$ | OCH$_3$ | CH$_2$C$_6$H$_5$ | CH$_3$ | H | H | H | 0 | 634 |
| 20 | NO$_2$ | H | Cl | NO$_2$ | NHCOCH$_3$ | OCH$_3$ | H | CH$_3$ | H | H | H | 0 | 592 |
| 21 | NO$_2$ | H | Cl | NO$_2$ | NHCOCH$_3$ | OC$_2$H$_5$ | H | CH$_3$ | H | H | H | 0 | 594 |
| 22 | NO$_2$ | H | Br | NO$_2$ | NHCOCH$_3$ | OCH$_3$ | H | CH$_3$ | H | H | H | 0 | 594 |
| 23 | NO$_2$ | H | Br | NO$_2$ | NHCOCH$_3$ | OCH$_3$ | H | C$_2$H$_5$ | H | H | H | 0 | 594 |
| 24 | NO$_2$ | H | Cl | NO$_2$ | NHCOCH$_3$ | OCH$_3$ | H | C$_2$H$_5$ | H | H | H | 0 | 600 |
| 25 | NO$_2$ | H | H | NO$_2$ | NHCOCH$_3$ | OCH$_3$ | H | C$_2$H$_5$ | H | H | H | 0 | 574 |
| 26 | NO$_2$ | H | H | NO$_2$ | NHCOCH$_3$ | OCH$_3$ | H | CH$_3$ | H | H | H | 0 | 574 |
| 27 | NO$_2$ | H | H | CF$_3$ | NHCOCH$_3$ | OCH$_3$ | H | CH$_3$ | H | H | H | 0 | 542 |
| 28 | NO$_2$ | H | Br | CN | NHCOCH$_3$ | OCH$_3$ | H | CH$_3$ | H | H | H | 0 | 624 |
| 29 | NO$_2$ | H | Br | CF$_3$ | NHCOCH$_3$ | OCH$_3$ | H | CH$_3$ | H | H | H | 0 | 562 |
| 30 | NO$_2$ | H | Br | NO$_2$ | NHCOC$_2$H$_5$ | OCH$_3$ | H | CH$_3$ | H | H | H | 0 | 596 |
| 31 | NO$_2$ | H | Cl | NO$_2$ | NHCOC$_2$H$_5$ | OCH$_3$ | H | CH$_3$ | H | H | H | 0 | 596 |
| 32 | NO$_2$ | H | H | NO$_2$ | NHCOC$_2$H$_5$ | OCH$_3$ | H | CH$_3$ | H | H | H | 0 | 576 |
| 33 | NO$_2$ | H | Br | NO$_2$ | NHCOC$_6$H$_5$ | OCH$_3$ | H | CH$_3$ | H | H | H | 0 | 586 |
| 34 | NO$_2$ | H | Cl | NO$_2$ | NHCOC$_6$H$_5$ | OCH$_3$ | H | CH$_3$ | H | H | H | 0 | 586 |
| 35 | NO$_2$ | H | H | NO$_2$ | NHCOC$_6$H$_5$ | OCH$_3$ | H | CH$_3$ | H | H | H | 0 | 572 |
| 36 | NO$_2$ | Cl | H | NO$_2$ | NHCOCH$_3$ | OCH$_3$ | H | CH$_3$ | H | H | H | 0 | 576 |
| 37 | NO$_2$ | H | Br | NO$_2$ | NHCOC$_6$H$_5$ | OCH$_3$ | CH$_2$CH$_3$ | CH$_3$ | H | H | H | 0 | 596 |
| 38 | NO$_2$ | H | Br | NO$_2$ | NHCOC$_2$H$_5$ | OCH$_3$ | CH$_2$CH$_3$ | CH$_3$ | H | H | H | 0 | 606 |
| 39 | NO$_2$ | H | Cl | NO$_2$ | NNCOC$_2$H$_5$ | OCH$_3$ | CH$_2$CH$_3$ | CH$_3$ | H | H | H | 0 | 608 |
| 40 | NO$_2$ | H | CN | NO$_2$ | NHCOCH$_3$ | OCH$_3$ | CH$_2$CH$_3$ | CH$_3$ | H | H | H | 0 | 648 |
| 41 | NO$_2$ | H | Br | NO$_2$ | NHCOC$_6$H$_5$ | H | CH$_2$CH$_3$ | CH$_3$ | H | H | H | 0 | 560 |
| 42 | NO$_2$ | H | Br | NO$_2$ | NHCOC$_2$H$_5$ | H | CH$_2$CH$_3$ | CH$_3$ | H | H | H | 0 | 558 |
| 43 | NO$_2$ | Cl | H | NO$_2$ | NHCOCH$_3$ | H | CH$_2$CH$_3$ | CH$_3$ | H | H | H | 0 | 548 |
| 44 | NO$_2$ | H | Cl | NO$_2$ | NHCOCH$_3$ | H | CH$_2$CH$_3$ | CH$_3$ | H | H | H | 0 | 560 |
| 45 | NO$_2$ | H | Cl | NO$_2$ | NHCOCH$_3$ | H | CH$_2$CH$_3$ | C$_2$H$_5$ | H | H | H | 0 | 560 |
| 46 | NO$_2$ | H | Br | NO$_2$ | NHCOCH$_3$ | H | CH$_2$CH$_3$ | CH$_3$ | H | H | H | 0 | 558 |
| 47 | NO$_2$ | H | Cl | NO$_2$ | NHCOCH$_3$ | H | n-C$_4$H$_9$ | CH$_3$ | H | H | H | 0 | 562 |
| 48 | NO$_2$ | H | Cl | H | NHCOCH$_3$ | H | n-C$_4$H$_9$ | CH$_3$ | H | H | H | 0 | 534 |
| 49 | NO$_2$ | H | H | H | NHCOCH$_3$ | H | n-C$_4$H$_9$ | CH$_3$ | H | H | H | 0 | 516 |
| 50 | NO$_2$ | H | Br | CN | NHCOCH$_3$ | H | n-C$_4$H$_9$ | CH$_3$ | H | H | H | 0 | 584 |
| 51 | NO$_2$ | H | CN | NO$_2$ | NHCOCH$_3$ | H | n-C$_4$H$_9$ | CH$_3$ | H | H | H | 0 | 604 |
| 52 | NO$_2$ | H | H | NO$_2$ | NHCOCH$_3$ | H | CH$_2$CH$_3$ | CH$_3$ | H | H | H | 0 | 548 |
| 53 | NO$_2$ | H | H | CN | NHCOCH$_3$ | H | CH$_2$CH$_3$ | CH$_3$ | H | H | H | 0 | 552 |
| 54 | NO$_2$ | H | Br | CN | NHCOCH$_3$ | H | CH$_2$CH$_3$ | CH$_3$ | H | H | H | 0 | 582 |
| 55 | NO$_2$ | H | Cl | CN | NHCOCH$_3$ | H | CH$_2$CH$_3$ | CH$_3$ | H | H | H | 0 | 582 |
| 56 | NO$_2$ | H | Cl | H | NHCOCH$_3$ | H | CH$_2$CH$_3$ | CH$_3$ | H | H | H | 0 | 534 |
| 57 | NO$_2$ | H | Br | H | NHCOCH$_3$ | H | CH$_2$CH$_3$ | CH$_3$ | H | H | H | 0 | 530 |
| 58 | NO$_2$ | H | H | H | NHCOCH$_3$ | H | CH$_2$CH$_3$ | CH$_3$ | H | H | H | 0 | 514 |
| 59 | NO$_2$ | H | Cl | NO$_2$ | NHCOCH$_3$ | H | CH$_2$C$_6$H$_5$ | CH$_3$ | H | H | H | 0 | 554 |
| 60 | NO$_2$ | H | H | CN | NHCOCH$_3$ | H | CH$_2$C$_6$H$_5$ | CH$_3$ | H | H | H | 0 | 546 |
| 61 | NO$_2$ | H | Br | NO$_2$ | NHCOCH$_3$ | H | CH$_2$C$_6$H$_5$ | CH$_3$ | H | H | H | 0 | 552 |
| 62 | NO$_2$ | H | Cl | H | NHCOCH$_3$ | H | CH$_2$C$_6$H$_5$ | CH$_3$ | H | H | H | 0 | 524 |
| 63 | NO$_2$ | H | H | NO$_2$ | NHCOCH$_3$ | H | CH$_2$C$_6$H$_5$ | CH$_3$ | H | H | H | 0 | 540 |

TABLE 1-continued

| Example | T¹ | T² | T³ | T⁴ | R¹ | R² | R³ | R⁵ | R⁴ | R⁶ | R⁷ | n | $\lambda_{max}$ (nm) DMF |
|---|---|---|---|---|---|---|---|---|---|---|---|---|---|
| 64 | NO₂ | H | H | H | NHCOCH₃ | H | CH₂C₆H₅ | CH₃ | H | H | H | 0 | 506 |
| 65 | H | Cl | H | Cl | NHCOCH₃ | H | CH₂C₆H₅ | CH₃ | H | H | H | 0 | 476 |
| 66 | NO₂ | H | Br | CN | NHCOCH₃ | H | CH₂C₆H₅ | CH₃ | H | H | H | 0 | 574 |
| 67 | NO₂ | H | H | CN | NHCOCH₃ | H | n-C₄H₉ | CH₃ | H | H | H | 0 | 554 |
| 68 | NO₂ | H | Cl | NO₂ | NHCOCH₃ | H | CH₂CH=CH₂ | CH₃ | H | H | H | 0 | 556 |
| 69 | NO₂ | H | H | CN | NHCOCH₃ | H | CH₂CH=CH₂ | CH₃ | H | H | H | 0 | 548 |
| 70 | NO₂ | H | H | Cl | NHSO₂CH₃ | H | CH₂C₆H₅ | CH₃ | H | H | H | 0 | 534 |
| 71 | NO₂ | H | H | H | NHSO₂CH₃ | H | CH₂C₆H₅ | CH₃ | H | H | H | 0 | 494 |
| 72 | NO₂ | H | H | CN | CH₃ | H | CH₂CH₃ | CH₃ | H | H | H | 0 | 548 |
| 73 | NO₂ | H | H | CN | CH₃ | H | n-C₄H₉ | CH₃ | H | H | H | 0 | 550 |
| 74 | NO₂ | H | H | Cl | CH₃ | H | n-C₄H₉ | CH₃ | H | H | H | 0 | 526 |
| 75 | NO₂ | H | CN | CN | CH₃ | H | n-C₄H₉ | CH₃ | H | H | H | 0 | 600 |
| 76 | NO₂ | H | CN | NO₂ | CH₃ | H | n-C₄H₉ | CH₃ | H | H | H | 0 | 590 |
| 77 | NO₂ | H | Br | CN | CH₃ | H | n-C₄H₉ | CH₃ | H | H | H | 0 | 562 |
| 78 | NO₂ | H | Cl | H | CH₃ | H | CH₂CH₃ | CH₃ | H | H | H | 0 | 524 |
| 79 | NO₂ | H | Cl | H | H | H | CH₂CH₃ | CH₃ | H | H | H | 0 | 512 |
| 80 | NO₂ | H | Cl | Cl | H | H | CH₂CH₃ | CH₃ | H | H | H | 0 | 440 |
| 81 | NO₂ | H | Br | Cl | H | H | CH₂CH₃ | CH₃ | H | H | H | 0 | 442 |
| 82 | NO₂ | H | Br | Br | H | H | CH₂CH₃ | CH₃ | H | H | H | 0 | 440 |
| 83 | NO₂ | H | H | Br | H | H | CH₂CH₃ | CH₃ | H | H | H | 0 | 508 |
| 84 | NO₂ | Cl | H | Cl | H | H | CH₂CH₃ | CH₃ | H | H | H | 0 | 512 |
| 85 | NO₂ | H | Br | Cl | H | H | n-C₄H₉ | CH₃ | H | H | H | 0 | 444 |
| 86 | NO₂ | H | Cl | Cl | H | H | CH₂C₆H₅ | CH₃ | H | H | H | 0 | 432 |
| 87 | NO₂ | H | Br | Cl | H | H | CH₂C₆H₅ | CH₃ | H | H | H | 0 | 434 |
| 88 | NO₂ | H | Cl | H | H | H | CH₂C₆H₅ | CH₃ | H | H | H | 0 | 500 |
| 89 | NO₂ | H | H | CN | H | H | CH₂C₆H₅ | CH₃ | H | H | H | 0 | 526 |
| 90 | NO₂ | H | H | CF₃ | H | H | CH₂C₆H₅ | CH₃ | H | H | H | 0 | 506 |
| 91 | NO₂ | H | Br | Br | H | H | CH₂C₆H₅ | CH₃ | H | H | H | 0 | 432 |
| 92 | NO₂ | H | H | Br | H | H | CH₂C₆H₅ | CH₃ | H | H | H | 0 | 498 |
| 93 | NO₂ | H | Cl | Cl | H | H | CH₂CH₂C₆H₅ | CH₃ | H | H | H | 0 | 440 |
| 94 | NO₂ | H | Br | Cl | H | H | CH₂CH₂C₆H₅ | CH₃ | H | H | H | 0 | 442 |
| 95 | NO₂ | H | Cl | Cl | H | H | CH₂CH₂OC₆H₅ | CH₃ | H | H | H | 0 | 436 |
| 96 | NO₂ | H | Br | Cl | H | H | CH₂CH₂OC₆H₅ | CH₃ | H | H | H | 0 | 432 |
| 97 | NO₂ | H | H | Cl | H | H | CH₂CH₂OC₆H₅ | CH₃ | H | H | H | 0 | 502 |
| 98 | NO₂ | H | H | CN | H | H | CH₂CH₂OC₆H₅ | CH₃ | H | H | H | 0 | 526 |
| 99 | NO₂ | H | Cl | Cl | H | H | CH₂CH₂CN | CH₃ | H | H | H | 0 | 424 |
| 100 | NO₂ | H | Br | Br | H | H | CH₂CH₂CN | CH₃ | H | H | H | 0 | 422 |
| 101 | NO₂ | H | Cl | Cl | CH₃ | H | CH₂CH₃ | CH₃ | H | H | H | 0 | 462 |
| 102 | NO₂ | H | Br | Cl | CH₃ | H | CH₂CH₃ | CH₃ | H | H | H | 0 | 460 |
| 103 | NO₂ | H | Cl | CN | CH₃ | H | CH₂CH₃ | CH₃ | H | H | H | 0 | 562 |
| 104 | NO₂ | H | Br | CN | CH₃ | H | CH₂CH₃ | CH₃ | H | H | H | 0 | 560 |
| 105 | NO₂ | H | CN | CN | CH₃ | H | CH₂CH₃ | CH₃ | H | H | H | 0 | 596 |
| 106 | NO₂ | H | H | H | CH₃ | H | CH₂CH₃ | CH₃ | H | H | H | 0 | 500 |
| 107 | NO₂ | H | H | Br | CH₃ | H | CH₂CH₃ | CH₃ | H | H | H | 0 | 522 |
| 108 | NO₂ | Cl | H | Cl | CH₃ | H | CH₂CH₃ | CH₃ | H | H | H | 0 | 524 |
| 109 | H | NO₂ | H | H | CH₃ | H | CH₂CH₃ | CH₃ | H | H | H | 0 | 452 |
| 110 | NO₂ | Cl | Cl | H | H | H | CH₂C₆H₅ | CH₃ | H | H | H | 0 | 500 |
| 111 | NO₂ | H | H | H | OH | H | CH₂CH₃ | CH₃ | H | H | H | 0 | 494 |
| 112 | NO₂ | H | H | Cl | OH | H | CH₂CH₃ | CH₃ | H | H | H | 0 | 530 |
| 113 | NO₂ | H | H | CN | OH | H | CH₂CH₃ | CH₃ | H | H | H | 0 | 544 |
| 114 | NO₂ | H | Cl | Cl | OH | H | CH₂CH₃ | CH₃ | H | H | H | 0 | 486 |
| 115 | NO₂ | H | H | H | Cl | OC₆H₅ | H | CH₃ | H | H | H | 0 | 478 |
| 116 | NO₂ | H | H | CN | Cl | OC₆H₅ | H | CH₃ | H | H | H | 0 | 524 |

TABLE 1-continued

| Example | T¹ | T² | T³ | T⁴ | R¹ | R² | R³ | R⁵ | R⁴ | R⁶ | R⁷ | n | $\lambda_{max}$ (nm) DMF |
|---|---|---|---|---|---|---|---|---|---|---|---|---|---|
| 117 | $NO_2$ | H | H | Cl | Cl | $OC_6H_5$ | H | $CH_3$ | H | H | H | 0 | 498 |
| 118 | $NO_2$ | H | Cl | Cl | Cl | $OC_6H_5$ | H | $CH_3$ | H | H | H | 0 | 444 |
| 119 | $NO_2$ | H | H | H | H | Cl | H | $CH_3$ | H | H | H | 0 | 450 |
| 120 | $NO_2$ | H | H | Cl | H | Cl | H | $CH_3$ | H | H | H | 0 | 472 |
| 121 | $NO_2$ | H | H | H | H | Cl | H | $C_2H_5$ | H | H | H | 0 | 450 |
| 122 | $NO_2$ | H | H | $NO_2$ | $NHCOCH_3$ | Cl | H | $CH_3$ | H | H | H | 0 | 520 |
| 123 | $NO_2$ | H | H | H | $NHCOCH_3$ | Cl | H | $CH_3$ | H | H | H | 0 | 486 |
| 124 | $NO_2$ | H | Cl | $NO_2$ | $NHCOCH_3$ | Cl | H | $CH_3$ | H | H | H | 0 | 536 |
| 125 | $NO_2$ | H | Cl | H | $NHCOCH_3$ | Cl | H | $CH_3$ | H | H | H | 0 | 508 |
| 126 | $NO_2$ | H | H | CN | $NHCOCH_3$ | Cl | H | $CH_3$ | H | H | H | 0 | 530 |
| 127 | $NO_2$ | H | Br | $NO_2$ | $NHCOCH_3$ | $OCH_3$ | H | $CH_3$ | $CH_3$ | H | H | 0 | 596 |
| 128 | $NO_2$ | H | Cl | $NO_2$ | $NHCOCH_3$ | $OCH_3$ | H | $CH_3$ | $CH_3$ | H | H | 0 | 596 |
| 129 | $NO_2$ | H | Cl | $NO_2$ | $NHCOCH_3$ | $OCH_3$ | H | $CH_3$ | H | $CH_3$ | H | 0 | 592 |
| 130 | $NO_2$ | H | Cl | $NO_2$ | $NHCOCH_3$ | $OCH_3$ | H | $CH_3$ | H | H | H | 1 | 601 |
| 131 | $NO_2$ | H | Br | $NO_2$ | $NHCOCH_3$ | $OCH_3$ | H | $CH_3$ | H | H | H | 1 | 600 |
| 132 | $NO_2$ | H | H | $NO_2$ | $NHCOCH_3$ | $OCH_3$ | H | $CH_3$ | H | H | H | 1 | 582 |
| 133 | $NO_2$ | H | Br | CN | $NHCOCH_3$ | $OCH_3$ | H | $CH_3$ | H | H | H | 1 | 630 |
| 134 | $NO_2$ | H | Cl | $NO_2$ | $NHCOCH_3$ | $OCH_3$ | H | $CH_3$ | H | H | $CH_3$ | 0 | 594 |
| 135 | $NO_2$ | H | Br | $NO_2$ | $NHCOCH_3$ | $OCH_3$ | H | $CH_3$ | H | H | $CH_3$ | 0 | 594 |
| 136 | $NO_2$ | H | H | $NO_2$ | $NHCOCH_3$ | $OCH_3$ | H | $CH_3$ | H | H | $CH_3$ | 0 | 576 |
| 137 | $NO_2$ | H | Cl | $NO_2$ | $NHCOCH_3$ | $OCH_3$ | H | $CH_3$ | H | H | $C_6H_5$ | 0 | 594 |
| 138 | $NO_2$ | H | Br | $NO_2$ | $NHCOCH_3$ | $OCH_3$ | H | $CH_3$ | H | H | $C_6H_5$ | 0 | 594 |
| 139 | $NO_2$ | H | H | $NO_2$ | $NHCOCH_3$ | $OCH_3$ | H | $CH_3$ | H | H | $C_6H_5$ | 0 | 576 |
| 140 | $NO_2$ | H | Br | $NO_2$ | $NHCOCH_3$ | $CH_3$ | H | $CH_3$ | H | H | H | 0 | 558 |
| 141 | $NO_2$ | H | Cl | $NO_2$ | $NHCOCH_3$ | $CH_3$ | H | $CH_3$ | H | H | H | 0 | 558 |
| 142 | $NO_2$ | H | Cl | H | $NHCOCH_3$ | $CH_3$ | H | $CH_3$ | H | H | H | 0 | 532 |
| 143 | $NO_2$ | H | Br | CN | $NHCOCH_3$ | $CH_3$ | H | $CH_3$ | H | H | H | 0 | 584 |
| 144 | $NO_2$ | H | H | $NO_2$ | $NHCOCH_3$ | $CH_3$ | H | $CH_3$ | H | H | H | 0 | 538 |
| 145 | $CH_3$ | H | CN | CN | $NHCOCH_3$ | H | $CH_2CH_3$ | $CH_3$ | H | H | H | 0 | 532 |

EXAMPLE 146

4.3 g of 3-amino-5-nitrobenzisothiazole are introduced into a mixture of 11 ml of sulfuric acid (96%) and 4 ml of phosphoric acid (85%). Then, 4.6 ml of nitrosylsulfuric acid (40%) are added dropwise at 10 to 15° C. The mixture is subsequently stirred at 10 to 15° C. for 4 hours. The diazonium salt solution thus obtained is speedily added dropwise to a mixture of 6.6 g of 2-oxopropyl 3-[(5-acetylaminophenyl) ethylamino]-propionate, 100 ml of methanol, 1.1 g of urea and 100 g of ice. The mixture is stirred at room temperature overnight and the precipitate is filtered off with suction, washed with 1:1 methanol/water and dried to leave 7.9 g of the dye of the formula (Ibb)

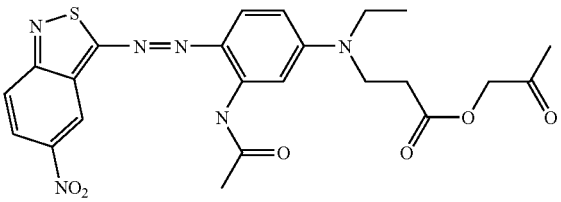

(Ibb)

($\lambda_{max}$[DMF]=622 nm), which dyes polyester in greenish blue shades and has very good wash and sublimation fastnesses.

Examples 147 to 173 of Table 2 were prepared in a similar manner.

TABLE 2

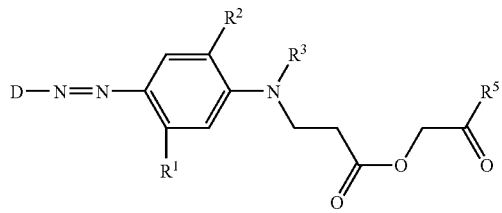

| Example | D | R¹ | R² | R³ | R⁵ | $\lambda_{max}$ [DMF] |
|---|---|---|---|---|---|---|
| 147 | 3-methyl-5-nitro-2,1-benzisothiazol-7-yl | NHCOCH₃ | OCH₃ | H | CH₃ | 648 |
| 148 | 3-methyl-5-nitro-2,1-benzisothiazol-7-yl | H | H | CH₂CH₃ | CH₃ | 606 |
| 149 | 3-methyl-5-nitro-2,1-benzisothiazol-7-yl | H | H | CH₂C₆H₅ | CH₃ | 594 |
| 150 | 3-methyl-5-nitro-2,1-benzisothiazol-7-yl | CH₃ | H | CH₂CH₃ | CH₃ | 618 |
| 151 | 4-bromo-3-methyl-5-nitro-2,1-benzisothiazol-7-yl | H | H | CH₂CH₃ | CH₃ | 622 |
| 152 | 4-bromo-3-methyl-5-nitro-2,1-benzisothiazol-7-yl | CH₃ | H | CH₂CH₃ | CH₃ | 636 |
| 153 | 2-methyl-6-nitrobenzothiazol-5-yl | CH₃ | H | CH₂CH₃ | CH₃ | 562 |
| 154 | 2-methyl-6-nitrobenzothiazol-5-yl | H | H | CH₂CH₃ | CH₃ | 550 |

TABLE 2-continued

| Example | D | R¹ | R² | R³ | R⁵ | $\lambda_{max}$ [DMF] |
|---|---|---|---|---|---|---|
| 155 | 6-nitro-2-methylbenzothiazole | H | H | CH₂C₆H₅ | CH₃ | 540 |
| 156 | 6-nitro-2-methylbenzothiazole | NHCOCH₃ | H | CH₂CH₃ | CH₃ | 564 |
| 157 | 5,6-dichloro-2-methylbenzothiazole | CH₃ | H | CH₂CH₃ | CH₃ | 540 |
| 158 | 5,6-dichloro-2-methylbenzothiazole | H | H | CH₂CH₃ | CH₃ | 530 |
| 159 | 5,6-dichloro-2-methylbenzothiazole | NHCOCH₃ | H | CH₂CH₃ | CH₃ | 542 |
| 160 | 5-nitro-2-methylthiazole | NHCOCH₃ | H | CH₂CH₃ | CH₃ | 596 |
| 161 | 4-chloro-5-formyl-2-methylthiazole | NHCOCH₃ | OCH₃ | H | CH₃ | 608 |
| 162 | 4-chloro-5-formyl-2-methylthiazole | NHCOCH₃ | H | CH₂CH₃ | CH₃ | 556 |
| 163 | 5-ethylthio-2-methyl-1,3,4-thiadiazole | NHCOCH₃ | H | CH₂CH₃ | CH₃ | 526 |
| 164 | 5-ethylthio-2-methyl-1,3,4-thiadiazole | NHCOCH₃ | H | CH₂C₆H₅ | CH₃ | 520 |

TABLE 2-continued

| Example | D | R¹ | R² | R³ | R⁵ | $\lambda_{max}$ [DMF] |
|---|---|---|---|---|---|---|
| 165 | 5-ethylthio-3-methyl-1,3,4-thiadiazol-2-yl | CH₃ | H | CH₂CH₃ | CH₃ | 520 |
| 166 | 3,5-dinitro-2-methylthien-4-yl | NHCOCH₃ | H | CH₂CH₃ | CH₃ | 644 |
| 167 | 3,5-dinitro-2-methylthien-4-yl | CH₃ | H | CH₂CH₃ | CH₃ | 668 |
| 168 | 3,5-dinitro-2-methylthien-4-yl | H | H | CH₂CH₃ | CH₃ | 650 |
| 169 | 3-chloro-4-cyano-5-methyl-2-formylthien-yl | NHCOCH₃ | H | CH₂CH₃ | CH₃ | 604 |
| 170 | 3-chloro-4-cyano-5-methyl-2-formylthien-yl | CH₃ | H | CH₂CH₃ | CH₃ | 607 |
| 171 | 3-chloro-4-cyano-5-methyl-2-formylthien-yl | H | H | CH₂CH₃ | CH₃ | 592 |
| 172 | 3-chloro-4-cyano-5-methyl-2-formylthien-yl | NHCOCH₃ | OCH₃ | CH₂CH₃ | CH₃ | 650 |

TABLE 2-continued

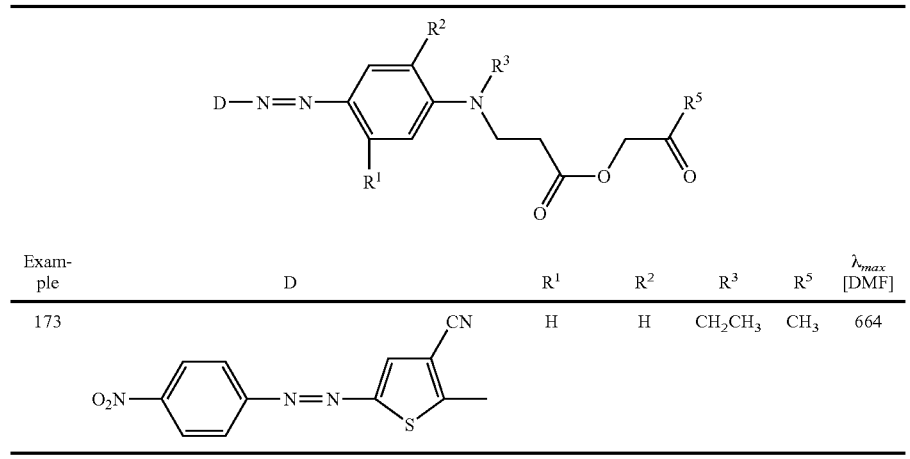

| Example | D | R¹ | R² | R³ | R⁵ | $\lambda_{max}$ [DMF] |
|---|---|---|---|---|---|---|
| 173 | 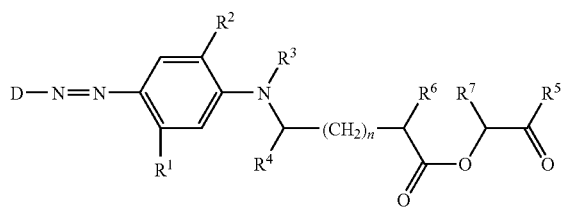 | H | H | CH₂CH₃ | CH₃ | 664 |

EXAMPLE 174

A textile fabric consisting of polyester is padded with a liquor consisting of 50 g/l of 8% sodium alginate solution, 100 g/l of 8-12% carob flour ether solution and 5 g/l of monosodium phosphate in water and then dried. The wet pickup is 70%.

The textile thus pretreated is then printed with an aqueous ink prepared in accordance with the procedure described above and containing
3.5% of the dye of Example 1,
2.5% of Disperbyk 190 dispersant,
30% of 1,5-pentanediol,
5% of diethylene glycol monomethyl ether,
0.01% of Mergal K9N biocide, and
58.99% of water
using a drop-on-demand (piezo) ink jet print head. The print is fully dried. Fixing is effected by means of superheated steam at 175° C. for 7 minutes. The print is subsequently subjected to an alkaline reduction clear, rinsed warm and then dried.

We claim:

1. A dye of the formula (I)

(I)

where
D is the radical of a diazo component;
$R^1$ is hydrogen, $(C_1-C_6)$-alkyl, $(C_1-C_4)$-alkoxy, hydroxyl, halogen, —NHCHO, —NHCO($C_1-C_6$)-alkyl, —NH-COaryl, —NHSO₂($C_1-C_6$)-alkyl or —NHSO₂aryl;
$R^2$ is hydrogen, $(C_1-C_6)$-alkyl, $(C_1-C_4)$-alkoxy, phenoxy or halogen;
$R^3$ is hydrogen, $(C_1-C_6)$-alkyl, substituted $(C_1-C_6)$-alkyl, $(C_3-C_4)$-alkenyl or substituted $(C_3-C_4)$-alkenyl;
or $R^2$ and $R^3$ combine to form the radical —C*H(CH₃)CH₂C(CH₃)₂—, where the carbon atom marked by * is attached to the phenyl nucleus;
$R^4$ is hydrogen, $(C_1-C_6)$-alkyl or phenyl;
$R^5$ is $(C_1-C_6)$-alkyl or substituted $(C_1-C_6)$-alkyl;
$R^6$ is hydrogen or $(C_1-C_6)$-alkyl;
$R^7$ is hydrogen, $(C_1-C_6)$-alkyl or phenyl; and
n 0, 1, 2 or 3;
although the compounds of the formulae

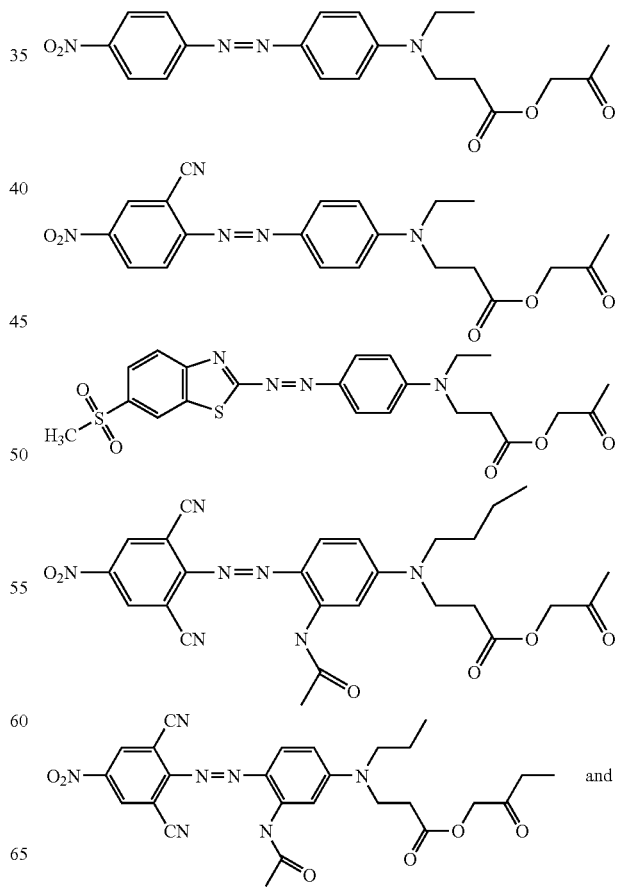

and

-continued

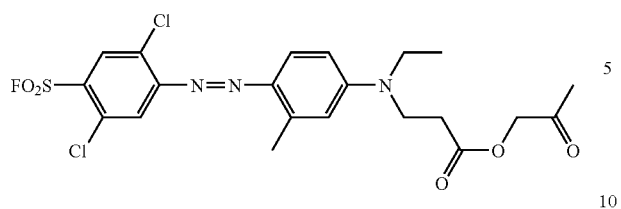

shall be excluded.

2. The dye as claimed in claim 1, wherein D represents a group of the formula (IIa)

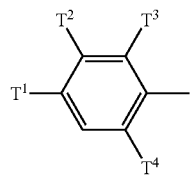
(IIa)

where

T$^1$ and T$^2$ independently are hydrogen, (C$_1$-C$_6$)-alkyl, (C$_1$-C$_4$)-alkoxy, —SO$_2$(C$_1$-C$_6$)-alkyl, —SO$_2$aryl, cyano, halogen or nitro; and T$^4$ and T$^3$ independently are hydrogen, halogen, trifluoromethyl, cyano, —SCN, —SO$_2$CH$_3$ or nitro;

although at least one of T$^1$, T$^2$, T$^3$ and T$^4$ is not hydrogen;

or represents a group of the formula (IIb)

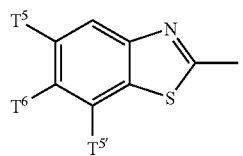
(IIb)

where

T$^5$ and T$^{5'}$ independently are hydrogen or halogen; and

T$^6$ is hydrogen, —SO$_2$CH$_3$, —SCN, (C$_1$-C$_4$)-alkoxy, halogen or nitro;

although at least one of T$^5$, T$^{5'}$ and T$^6$ is not hydrogen;

or represents a group of the formula (IIc)

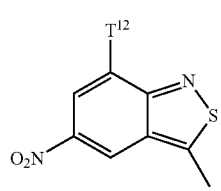
(IIc)

where

T$^{12}$ is hydrogen or halogen;

or represents a group of the formula (IId)

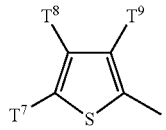
(IId)

where

T$^7$ is nitro, —CHO, cyano, —COCH$_3$ or a group of the formula

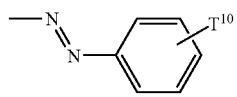

where T$^{10}$ is hydrogen, halogen, nitro or cyano;

T$^8$ is hydrogen, (C$_1$-C$_6$)-alkyl or halogen; and

T$^9$ is nitro, cyano, —COCH$_3$ or —COOT$^{11}$; where T$^{11}$ is (C$_1$-C$_4$)-alkyl;

or represents a group of the formula (IIe)

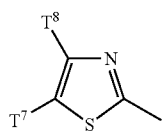
(IIe)

where T$^7$ and T$^8$ are each as defined above;

or represents a group of the formula (IIf)

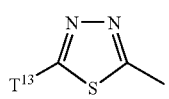
(IIf)

where T$^{13}$ is phenyl or S—(C$_1$-C$_4$)-alkyl.

3. The dye as claimed in claim 1, wherein

R$^1$ is hydrogen, chlorine, methyl, ethyl, methoxy, hydroxyl, ethoxy, acetylamino, propionylamino, benzoylamino, methylsulfonylamino, ethylsulfonylamino or phenylsulfonylamino;

R$^2$ is hydrogen, chlorine, methyl, ethyl, methoxy, ethoxy or phenoxy;

R$^3$ is hydrogen, methyl, ethyl, propyl, butyl, benzyl, phenylethyl, phenoxyethyl, methoxyethyl, cyanoethyl, —C$_2$H$_4$OCOCH$_3$, —C$_2$H$_4$OCOC$_2$H$_5$, —C$_2$H$_4$COOCH$_3$, —C$_2$H$_4$COOC$_2$H$_5$ or allyl;

R$^4$ and R$^7$ are hydrogen, methyl or phenyl;

R$^5$ is methyl or ethyl;

R$^6$ is hydrogen or methyl; and n is 0 or 1;

although the compounds of the formulae

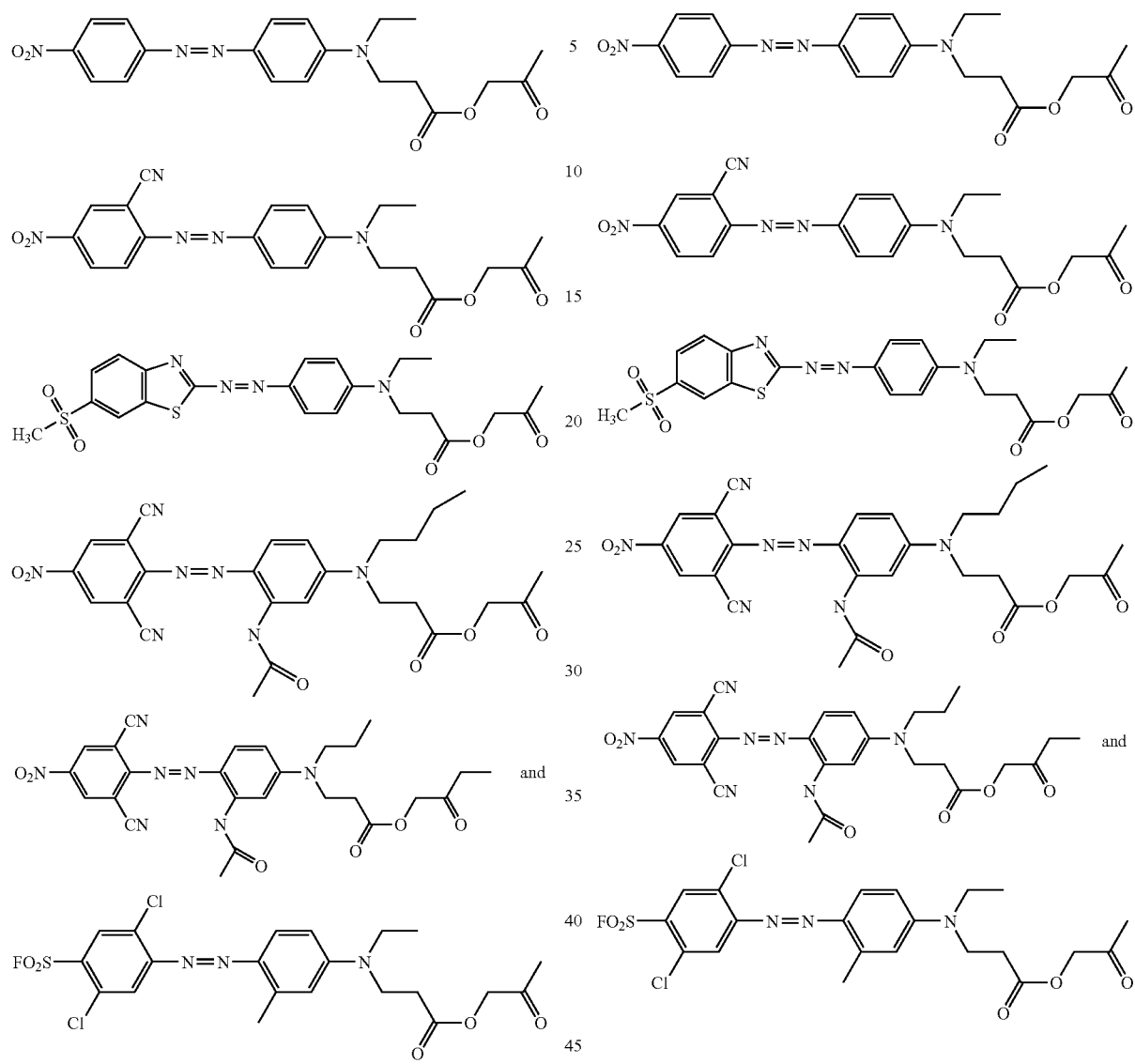

shall be excluded.

4. The dye as claimed in claim 2, wherein $R^1$ is hydrogen, chlorine, methyl, ethyl, methoxy, hydroxyl, ethoxy, acetylamino, propionylamino, benzoylamino, methylsulfonylamino, ethylsulfonylamino or phenylsulfonylamino;

$R^2$ is hydrogen, chlorine, methyl, ethyl, methoxy, ethoxy or phenoxy;

$R^3$ is hydrogen, methyl, ethyl, propyl, butyl, benzyl, phenylethyl, phenoxyethyl, methoxyethyl, cyanoethyl, —$C_2H_4OCOCH_3$, —$C_2H_4OCOC_2H_5$, —$C_2H_4COOCH_3$, —$C_2H_4COOC_2H_5$ or allyl;

$R^4$ and $R^7$ are hydrogen, methyl or phenyl;

$R^5$ is methyl or ethyl;

$R^6$ is hydrogen or methyl; and n is 0 or 1;

although the compounds of the formulae shall be excluded.

5. The dye according to claim 1, conforming to the formula (Ia)

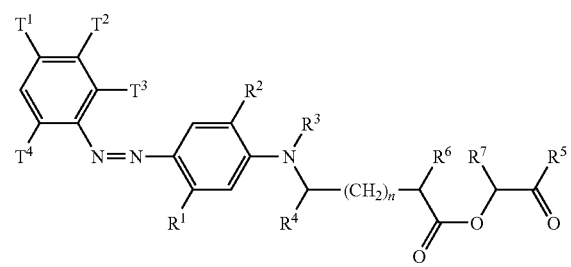

where $T^1$ to $T^4$, $R^1$ to $R^7$ and n are each as defined in claim 1, although the compounds of the formulae

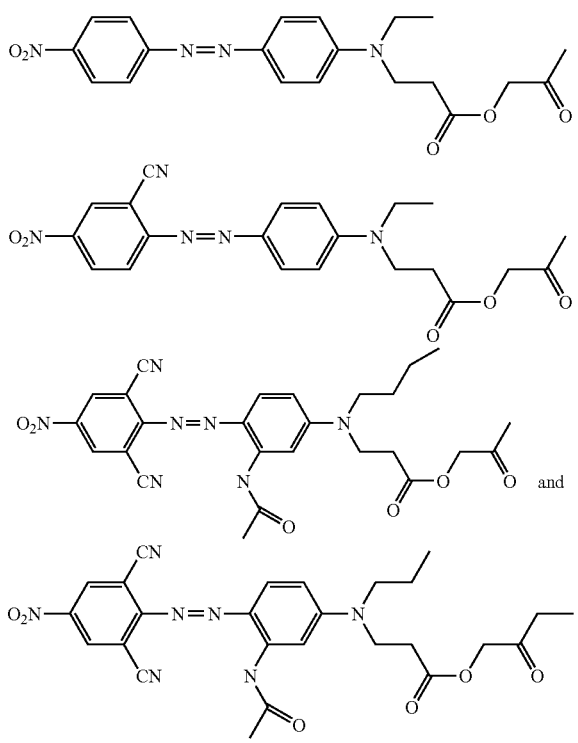

shall be excluded.

6. The dye as claimed in claim 5, wherein
$R^1$ is acetylamino, propionylamino, benzoylamino or methylsulfonylamino;
$R^2$ is hydrogen, chlorine, methoxy or ethoxy;
$R^3$ is hydrogen, methyl, ethyl, allyl or benzyl;
$R^4$ is hydrogen or methyl;
$R^5$ methyl or ethyl;
$R^6$ is hydrogen or methyl and
$R^7$ is hydrogen, methyl or phenyl.

7. The dye as claimed in claim 5, conforming to the formula (Iaa)

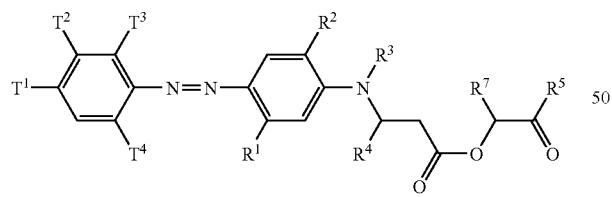

where
$T^1$ is hydrogen, nitro or methyl;
$T^2$ is hydrogen, nitro or chlorine;
$T^3$ is hydrogen, cyano, chlorine or bromine;
$T^4$ is hydrogen, cyano, nitro, chlorine, bromine or trifluoromethyl;
$R^1$ is hydrogen, hydroxyl, chlorine, methyl, acetylamino, propionylamino, benzoylamino or methylsulfonylamino;
$R^2$ is hydrogen, chlorine, methyl, phenoxy, methoxy or ethoxy;
$R^3$ is hydrogen, methyl, ethyl, butyl, benzyl, phenylethyl, phenoxyethyl or allyl;
$R^5$ is methyl or ethyl; and
$R^4$ and $R^7$ are hydrogen, methyl or phenyl;
although the compounds of the formulae

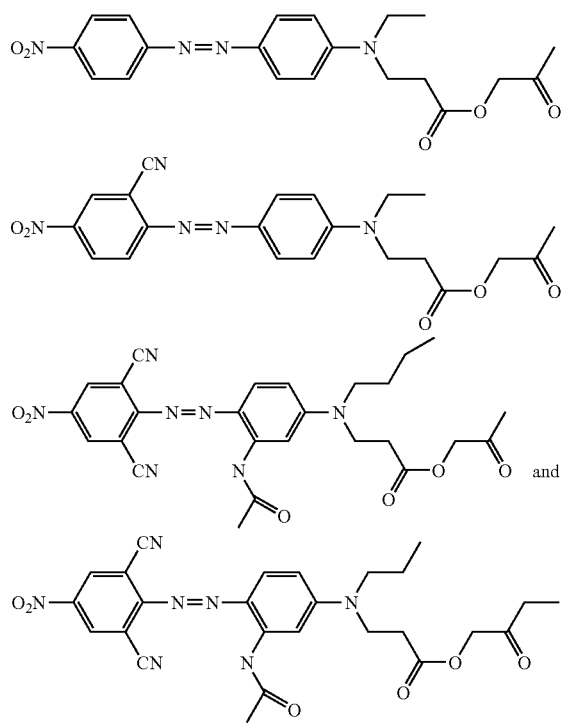

shall be excluded.

8. The dye as claimed in claim 7, wherein $T^3$ is chlorine or bromine and $R^1$ is hydrogen or methyl.

9. A process for preparing a dye of the formula (I) as claimed in claim 1, which comprises diazoting a compound of the formula (III)

$$D\text{-}NH_2 \qquad (III)$$

where D is as defined in claim 1, and coupling onto a compound of the formula (IV)

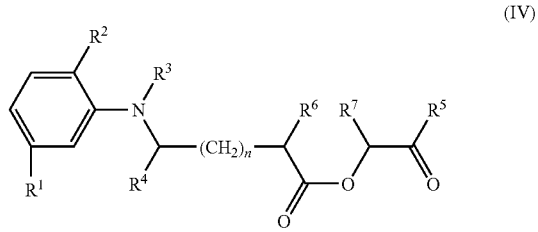

where $R^1$ to $R^7$ and n are each as defined in claim 1.

10. A process for dyeing and printing a hydrophobic material which comprises contacting the material with the dye as claimed in claim 1.

11. An ink for digital textile printing by the ink jet process, comprising the dye of the formula (I) as claimed in claim 1.

12. An ink for digital textile printing by the ink jet process, comprising the dye of the formula (I) as claimed in claim 8.

* * * * *